US009056782B2

(12) United States Patent
Lee et al.

(10) Patent No.: US 9,056,782 B2
(45) Date of Patent: Jun. 16, 2015

(54) TECHNIQUE FOR MANUFACTURING PLATINUM-MANGANESE DIOXIDE/CARBON COMPLEX FOR USE IN POSITIVE ELECTRODE OF LITHIUM-AIR BATTERY

(75) Inventors: Ho Taek Lee, Seoul (KR); Kyoung Han Ryu, Gyeonggi-do (KR); Yongsug Tak, Incheon (KR); Sung-Hyeon Baeck, Incheon (KR); Jinsub Choi, Incheon (KR); Jin Yong Shim, Incheon (KR)

(73) Assignees: Hyundai Motor Company, Seoul (KR); Inha-Industry Partnership Institute, Incheon (KR)

( * ) Notice: Subject to any disclaimer, the term of this patent is extended or adjusted under 35 U.S.C. 154(b) by 847 days.

(21) Appl. No.: 13/273,517

(22) Filed: Oct. 14, 2011

(65) Prior Publication Data

US 2013/0022529 A1 Jan. 24, 2013

(30) Foreign Application Priority Data

Jul. 20, 2011 (KR) ........................ 10-2011-0072117

(51) Int. Cl.
*B01J 23/32* (2006.01)
*B01J 23/40* (2006.01)
(Continued)

(52) U.S. Cl.
CPC .............. *C01G 45/02* (2013.01); *C01P 2002/72* (2013.01); *C01P 2004/04* (2013.01);
(Continued)

(58) Field of Classification Search
USPC ....................... 502/5, 185, 324; 429/224, 524; 252/506, 514

IPC .......... B01J 37/34,37/346, 23/32, 23/40, 23/74; H01M 4/02, 4/13, 4/36, 4/50, 4/92, 4/921, H01M 2004/028

See application file for complete search history.

(56) References Cited

U.S. PATENT DOCUMENTS 4,482,641 A * 11/1984 Wennerberg .................. 502/182
5,378,562 A    1/1995 Passaniti et al.
(Continued)

FOREIGN PATENT DOCUMENTS

CN   10-1964423   *  2/2011  .............. H01M 4/90
JP   10-152326       6/1998
(Continued)

OTHER PUBLICATIONS

MnO2—Pt/C composite electrodes for preventing voltage reversal effects with polymer electrolyte membrane fuel cells, Z. D. Wei et al. Journal of Power Sources 160 (2006), pp. 246-251.*

(Continued)

*Primary Examiner* — Patricia L Hailey
(74) *Attorney, Agent, or Firm* — Mintz Levin Cohn Ferris Glovsky and Popeo, P.C.; Peter F. Corless

(57) ABSTRACT

Disclosed is a method for preparing a platinum-manganese dioxide/carbon complex for a positive-electrode material of a lithium-air battery. More specifically, a manganese dioxide/carbon complex is prepared by dispersing carbon in a manganese dioxide precursor solution and applying microwaves, filtering and drying to the resulting solution. Next a platinum-manganese dioxide/carbon complex is prepared by dispersing the manganese dioxide/carbon complex in ethylene glycol, adding a platinum precursor and applying microwaves to the resulting solution. The platinum-manganese dioxide/carbon complex synthesized according to the present invention exhibits lower overvoltage and higher current density in oxygen reduction and oxidation reactions as compared to either a manganese dioxide/carbon complex or a platinum/carbon complex.

7 Claims, 5 Drawing Sheets

(51) Int. Cl.
*B01J 23/74* (2006.01)
*B01J 37/34* (2006.01)
*H01M 4/02* (2006.01)
*H01M 4/13* (2010.01)
*H01M 4/36* (2006.01)
*H01M 4/50* (2010.01)
*H01M 4/92* (2006.01)
*C01G 45/02* (2006.01)
*H01M 4/86* (2006.01)
*H01M 4/90* (2006.01)
*H01M 12/08* (2006.01)

(52) U.S. Cl.
CPC .......... *H01M4/8652* (2013.01); *H01M 4/9083* (2013.01); *H01M 4/926* (2013.01); *H01M 12/08* (2013.01); *H01M 2004/8689* (2013.01); *Y02E 60/50* (2013.01)

(56) References Cited

U.S. PATENT DOCUMENTS

| | | | | |
|---|---|---|---|---|
| 5,780,384 | A * | 7/1998 | Tomczak et al. | 502/324 |
| 7,138,159 | B2 * | 11/2006 | Hampden-Smith et al. | 427/376.1 |
| 8,603,931 | B2 * | 12/2013 | Min et al. | 502/5 |
| 8,652,685 | B2 * | 2/2014 | Guo | 429/224 |
| 2007/0244003 | A1 * | 10/2007 | Majima et al. | 502/319 |
| 2008/0020924 | A1 * | 1/2008 | Jeng et al. | 502/185 |
| 2010/0285392 | A1 * | 11/2010 | Elabd et al. | 429/484 |
| 2011/0014550 | A1 * | 1/2011 | Jiang et al. | 429/528 |
| 2011/0274989 | A1 * | 11/2011 | Lu et al. | 429/405 |

FOREIGN PATENT DOCUMENTS

| | | |
|---|---|---|
| JP | 2004-507341 A | 3/2004 |
| JP | 2006-302822 A | 11/2006 |
| KR | 10-2000-0063843 A | 11/2000 |

OTHER PUBLICATIONS

"Electrochemically synthesized Pt—MnO2 composite particles for simultaneous determination of catachol and hydroquinone," Binesh Unnikrishnan et al. Sensors and Actuators B 169 (2012), pp. 235-242.*

Zhou et al., "MnO2/CNT Supported Pt and PtRu Nanocatalyst for Direct Methanol Fuel Cells", Langmuir, vol. 25, No. 13, pp. 7711-7717 (2009).

Li et al., "MnO2 nanoflakes coated on multi-walled carbon nanotubes for rechargeable lithium-air batteries", Electrochemistry Communications (2011).

Trogadas et al., "Pt/C/MnO2 hybrid electrocatalysts for degradation mitigation in polymer electrolyte fuel cells", Journal of Power Sources, vol. 174, pp. 159-163 (2007).

Huang et al., "Preparation and Properties of Manganese Oxide/Carbon Composites by Reduction of Potassium Permanganate with Acetylene Black", Journal of the Electrochemical Society, vol. 154, No. 1, pp. A26-A33 (2007).

* cited by examiner

TECHNIQUE FOR MANUFACTURING PLATINUM-MANGANESE DIOXIDE/CARBON COMPLEX FOR USE IN POSITIVE ELECTRODE OF LITHIUM-AIR BATTERY

CROSS-REFERENCE TO RELATED APPLICATIONS

This application claims priority under 35 U.S.C. §119 to Korean Patent Application No. 10-2011-0072117, filed on Jul. 20, 2011, in the Korean Intellectual Property Office, the disclosure of which is incorporated herein by reference in its entirety.

BACKGROUND (a) Technical Field

The present invention relates to a system and method for preparing a platinum-manganese dioxide/carbon complex for a positive-electrode material of a lithium-air battery using microwaves.

(b) Background Art

In recent years, it has been determined that the currently available fuel cells or other secondary cells are not sufficient to meet the future market's requirements, such as energy density, operation time, compact size, or the like, and face other various problems. Accordingly, there is an urgent need for the development of a battery which can exhibit a higher energy density with improved safety, environment-friendliness and cost effectiveness than those of the existing secondary batteries or fuel cells.

In this regard, the lithium-air battery has gained a lot of attention over the last few decades from battery researchers due to its high energy density. The theoretical energy density (specific energy) of the lithium-air battery is well over that of the lithium-ion battery. As proven through the successful development and commercialization of the zinc-air battery, the high energy of a metal-air battery has peaked considerable interests.

As a positive-electrode material for a lithium-air battery, manganese dioxide/carbon complex or platinum/carbon complex has been proposed. However, such complexes are problematic because of overvoltage and low current density associated with these metals as they are currently manufactured.

SUMMARY

The present invention is directed to providing a system and method for preparing an air electrode catalyst for embodying a high-efficiency lithium-air battery. In one general aspect, the present invention provides a method for preparing a platinum-manganese dioxide/carbon complex for a positive-electrode material of a lithium-air battery, including: a first step of preparing a manganese dioxide/carbon complex by dispersing carbon in a manganese dioxide precursor solution and applying microwaves, followed by filtering and drying the complex; and a second step of preparing a platinum-manganese dioxide/carbon complex by dispersing the manganese dioxide/carbon complex in ethylene glycol, adding a platinum precursor and applying microwaves. Once manufactured by the above method, the resulting platinum-manganese dioxide/carbon complex may be used in a lithium-air battery as a positive-electrode material.

The above and other aspects and features of the present invention will be described infra.

BRIEF DESCRIPTION OF THE DRAWINGS

The above and other objects, features and advantages of the present invention will now be described in detail with reference to certain exemplary embodiments thereof illustrated in the accompanying drawings which are given hereinbelow by way of illustration only, and thus are not limitative of the invention, and wherein.

DETAILED DESCRIPTION

Figure 1:
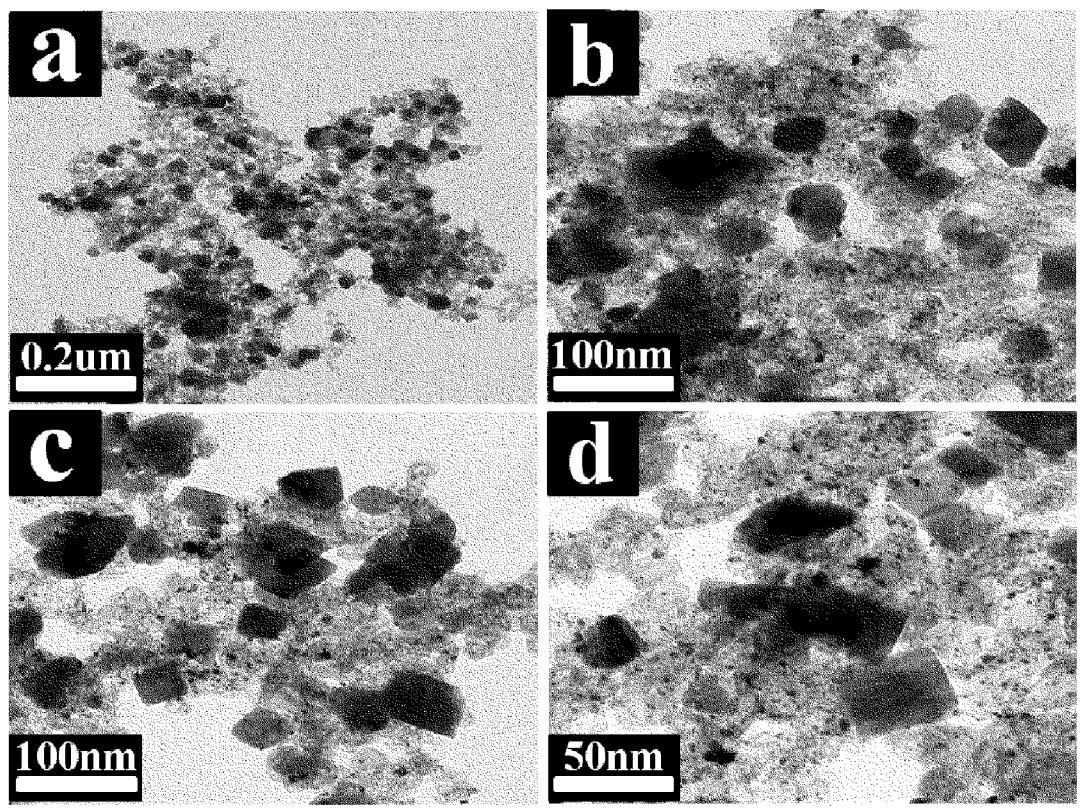
FIG. 1 shows transmission electron microscopic (TEM) images of a platinum-manganese dioxide/carbon complex prepared in Example 1.

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a system and method for preparing a platinum-manganese dioxide/carbon complex for a positive-electrode material of a lithium-air battery. First, a manganese dioxide/carbon complex is prepared by dispersing carbon in a manganese dioxide precursor solution and applying microwaves, filtering and drying the solution. Next, a complex is prepared by dispersing the manganese dioxide/carbon complex in $C_1$-$C_6$ alcohol, adding a platinum precursor and applying microwaves to the platinum-manganese dioxide/carbon complex.

More specifically, the manganese dioxide precursor may be, for example, potassium permanganate ($KMnO_4$), and a solvent of the manganese dioxide precursor solution may be water or ethylene glycol. Specifically, about 20 parts by weight of the manganese dioxide precursor may be used per about 100 parts by weight of carbon. When the amount of the manganese dioxide precursor is less than 20 parts by weight, catalytic activity may be insufficient. And, an amount exceeding 20 parts by weight, however, is uneconomical and thus undesirable according to certain costs associated with the manufacture.

In the initial step, the microwaves may be applied for about 5-10 minutes. When the application time is less than about 5 minutes, nuclear growth may not occur appropriately on the carbon support. Meanwhile, if the time exceeds about 10 minutes, aggregation may occur. After the application of microwaves, the manganese dioxide/carbon complex may be obtained by filtering to remove the solvent and then drying the solution to form the manganese dioxide/carbon complex.

In the second step, a platinum-manganese dioxide/carbon complex is prepared by dispersing the manganese dioxide/ carbon complex in ethylene glycol, adding a platinum precursor and applying microwaves. The platinum precursor may be, for example, chloroplatinic acid ($H_2PtCl_6$). Specifically, about 20 parts by weight of the platinum precursor may be used per about 100 parts by weight of carbon. When the amount of the platinum precursor is less than about 20 parts by weight, catalytic activity may be insufficient. However, an amount exceeding about 20 parts by weight is uneconomical due to the waste and cost associated with the excess platinum precursor.

In the second step, the microwaves may be applied for about 5-10 minutes. As described above, when the application time is less than about 5 minutes, nuclear growth may not occur well on the support. Meanwhile, if the time exceeds about 10 minutes, the platinum particles may aggregate. After the application of microwaves, the platinum-manganese dioxide/carbon complex may be obtained by filtering to remove the solvent and then drying the platinum-manganese solution.

This resulting platinum-manganese dioxide/carbon complex may then be advantageously used in a lithium-air battery as a positive-electrode material.

EXAMPLES

The examples and experiments will now be described. The following examples and experiments are for illustrative purposes only and not intended to limit the scope of this invention.

Example 1

Preparation of Platinum-Manganese Dioxide/Carbon Complex

In Example 1, 0.75 g of potassium permanganate ($KMnO_4$) powder was added to a 200-mL beaker. Then, after adding 150 mL of distilled water to the beaker, the solutes were dissolved completely by stirring the solution for about 10 minutes.

After adding 0.5 g of Ketjen black carbon to the manganese dioxide precursor solution, the mixture was again stirred for 1 hour. After applying microwaves for 5 minutes to the re-stirred solution, the solution was filtered and dried to obtain a manganese dioxide/carbon complex containing 20 wt % of manganese dioxide.

Next, in a 200-mL beaker, 150 mL of ethylene glycol was added to 0.5 g of the prepared manganese dioxide/carbon complex powder. After stifling for 10 minutes, 0.4 g of chloroplatinic acid ($H_2PtCl_6$) was added to the stirred solution. After stirring for 10 minutes more, microwaves were applied for 5 minutes. The resulting solution was then filtered and dried, resulting in a platinum-manganese dioxide/carbon complex containing 20 wt % of platinum and 20 wt % or manganese dioxide.

FIG. 1 shows transmission electron microscopic (TEM) images of the platinum-manganese dioxide/carbon complex powder. As seen from FIG. 1, platinum and manganese dioxide supported on Ketjen black carbon could be identified.

Figure 2:
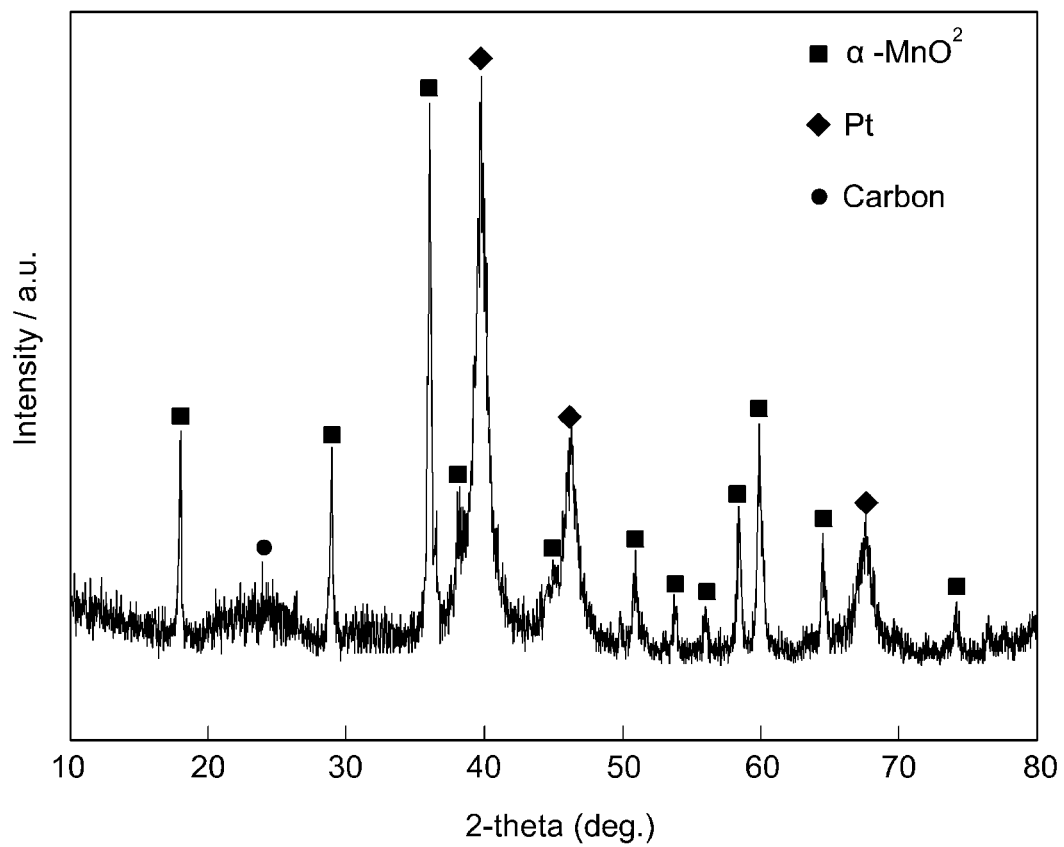
FIG. 2 shows an X-ray diffraction pattern of a platinum-manganese dioxide/carbon complex prepared in Example 1.

FIG. 2 shows an X-ray diffraction pattern. As seen from FIG. 2, the characteristic peak of Ketjen black carbon was found around 25° and the characteristic peaks of α-phase manganese dioxide and platinum were also observed, revealing that manganese dioxide and platinum are uniformly dispersed in the resulting complex.

Comparative Example 1

Preparation of Manganese Dioxide/Carbon Complex

Nothing was performed further after the manganese dioxide/carbon complex was prepared in Example 1.

Comparative Example 2

Preparation of Platinum/Carbon Complex 0.5 g of Ketjen black carbon was added to 150 mL of ethylene glycol in a 200-mL beaker and stirred for 10 minutes. After adding 0.4 g of chloroplatinic acid ($H_2PtCl_6$) to the stirred solution and stirring for an additional 10 minutes, microwaves were applied for 5 minutes to the resulting platinum/carbon solution.

Test Example 1

Preparation of Air Electrode for Lithium-Air Battery

After adding 19 mg of the powder prepared in Example 1 or Comparative Examples 1-2 and 1 mg of polyvinylidene fluoride (PVDF) in a 5-mL beaker, 1.5 mL of N-methyl-2-pyrrolidone (NMP) was added to the beaker and the mixture was stirred for about 30 minutes. Next, nickel (Ni) foam was added to the resultant electrolyte solution and the resultant electrolyte solution ultrasonically was stirred for about 30 minutes, and the nickel foam was dried in an oven at 110° C. for 10 hours to prepare an air electrode for a lithium-air secondary battery.

Test Example 2

Evaluation of Air Electrode Performance

A Swagelok-type cell was used to evaluate the performance of the prepared air electrode (*Journal of The Electrochemical Society*, 156 (2009), 44). The cell was assembled inside a glove box filled with argon gas. Lithium metal (0.38-mm thick, Sigma Aldrich) was used as the anode, and 1 M $LiPF_6$ in PC:EC:DEC (1:4:5 vol %) was used as the electrolyte. The electrolyte was supported on a glass fiber separator (GF/D, Whatman), and the synthesized catalyst was placed on nickel foam with a mass ratio of 95:5 for use as the cathode. An oxygen atmosphere was maintained during charge-discharge test.

Figure 3:
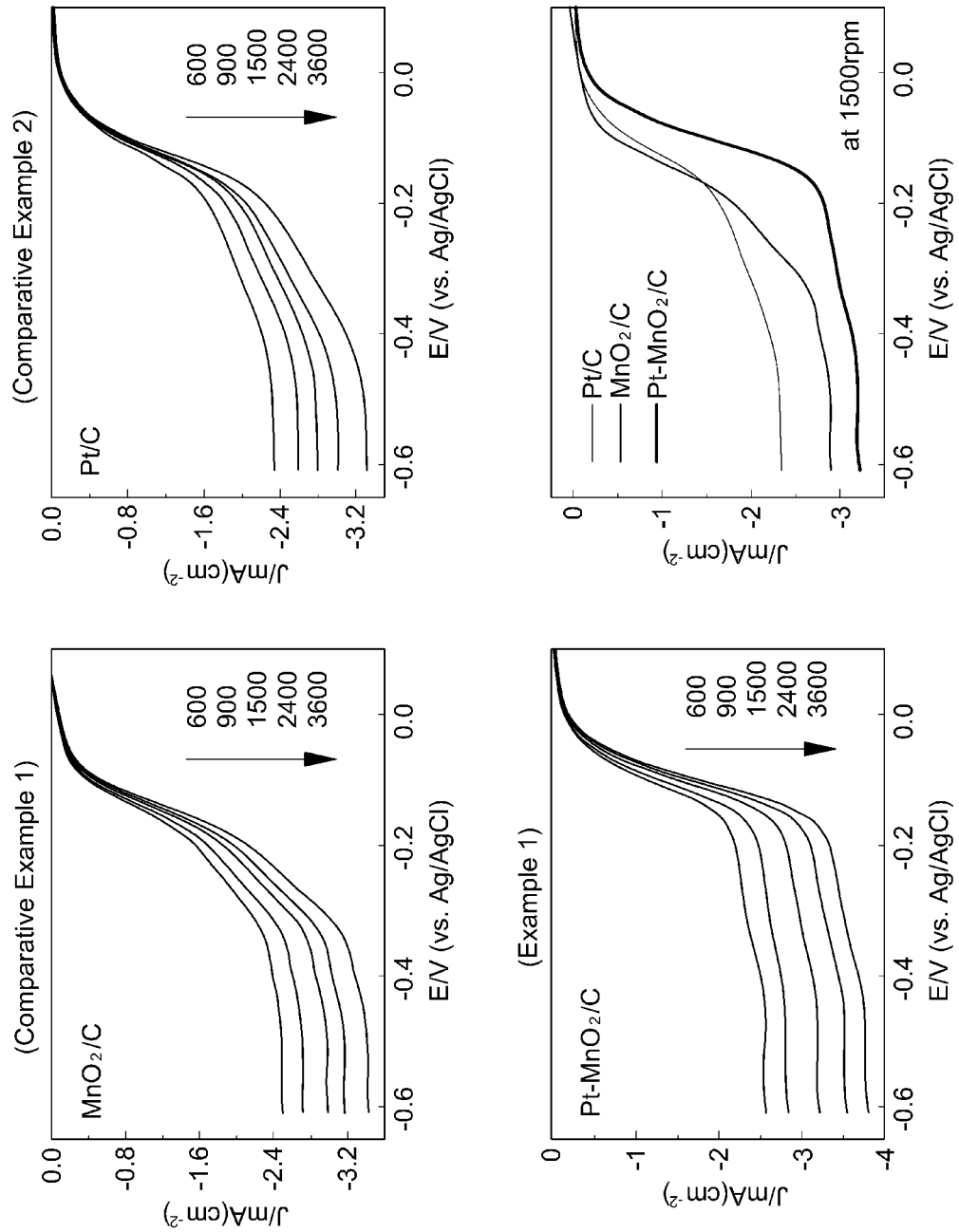
FIG. 3 shows a result of oxygen reduction reaction experiment for Example 1 and Comparative Examples 1-2.

FIG. 3 shows a result of oxygen reduction reaction experiment for Example 1 and Comparative Examples 1-2. As seen from FIG. 3, the oxygen reduction reaction experiment result revealed lower overvoltage and higher current density, hence better electrochemical performance, for the catalyst of Example 1 as compared to those of Comparative Examples 1 and 2.

Figure 4:
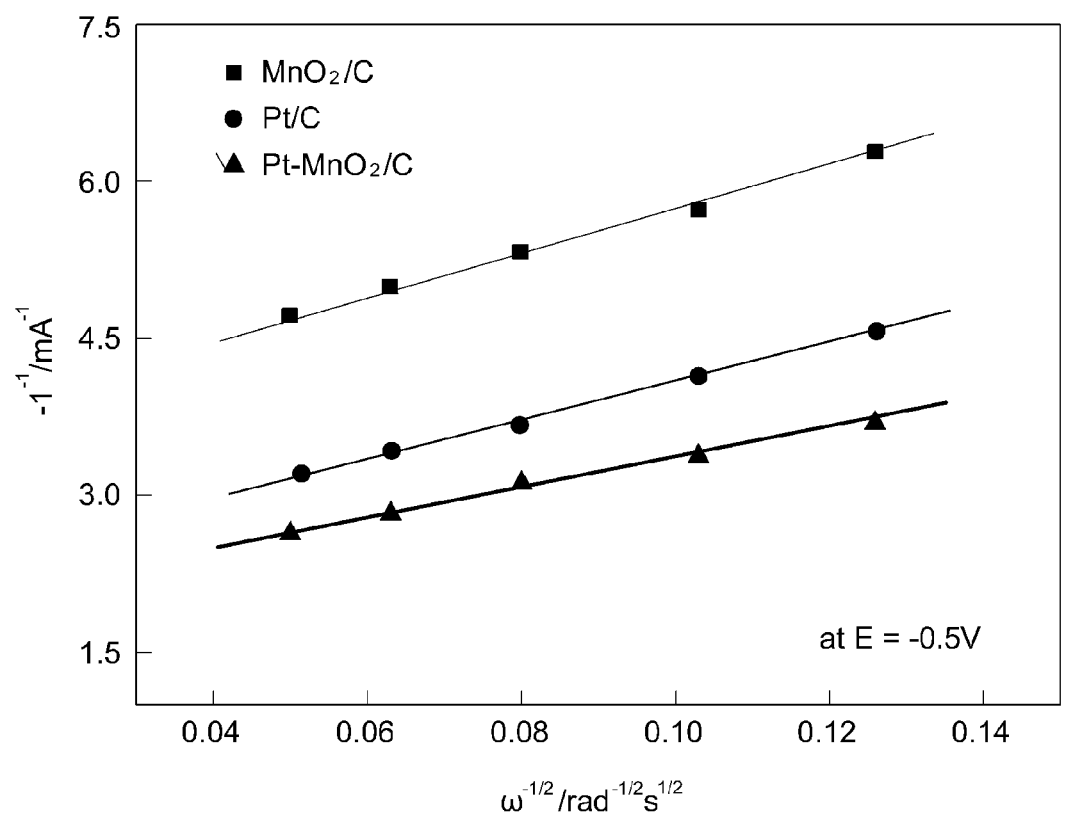
FIG. 4 shows Koutecky-Levich plots for Example 1 and Comparative Examples 1-2.
Figure 5:
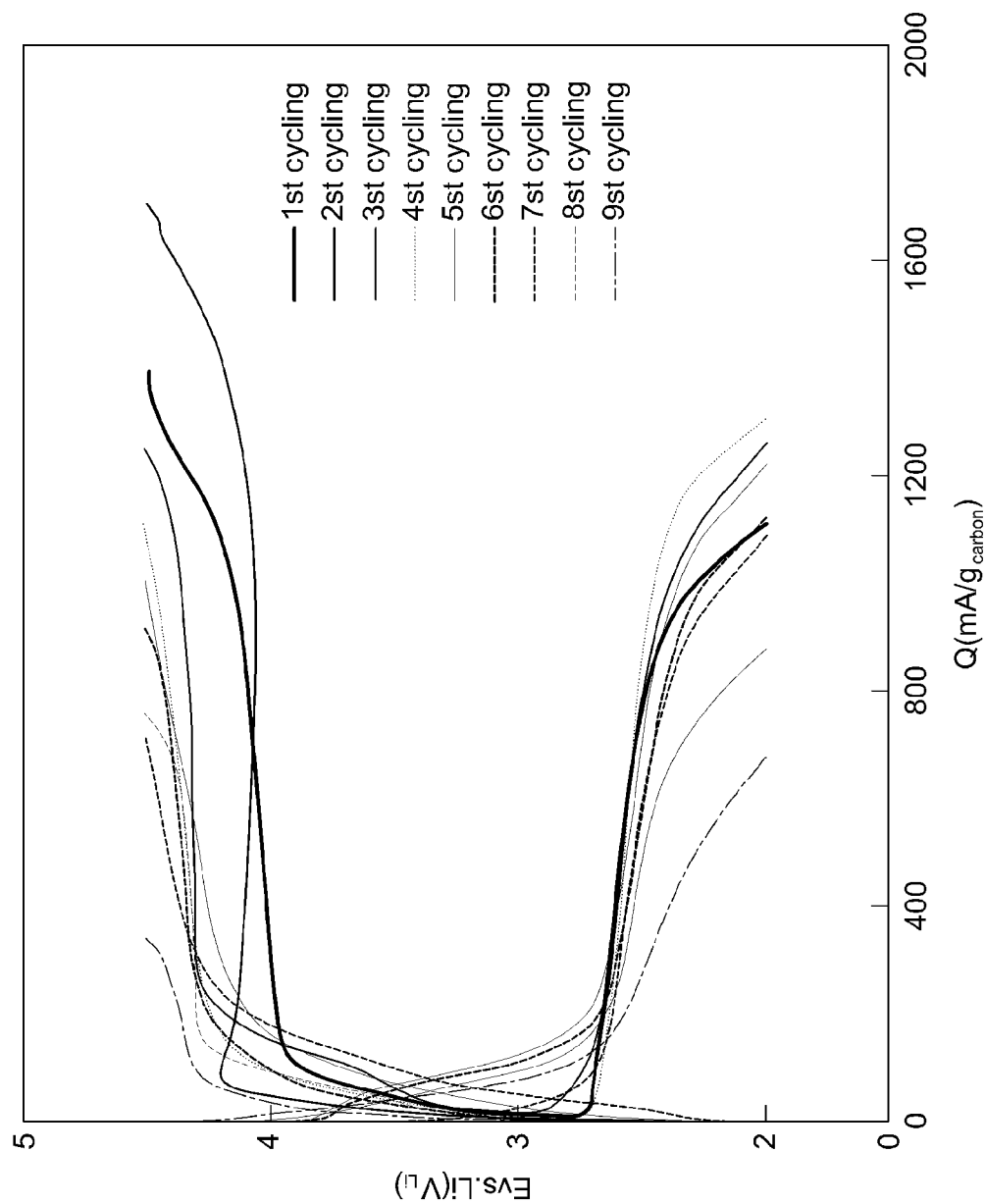
FIG. 5 shows a result of a charge-discharge test for Example 1.

Koutecky-Levich plots were constructed in order to compare the number of electrons participating in the oxygen reduction reaction (FIG. 4). As seen from FIG. 4, the catalyst of Example 1 showed a result nearer to the theoretical value of four electrons as compared to the catalysts of Comparative Examples 1 and 2. Finally, a charge-discharge test was performed with the catalyst prepared in Example 1. The result is shown in FIG. 5. It can be seen that the catalyst exhibits suitable cycle performance.

The platinum-manganese dioxide/carbon complex synthesized according to the present invention exhibits lower overvoltage and higher current density in oxygen reduction and oxidation reactions as compared to a manganese dioxide/carbon complex or a platinum/carbon complex. Accordingly, it can be usefully as an active positive-electrode material for designing a lithium-air battery with improved performance.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A method for preparing a platinum-manganese dioxide/carbon complex for a positive-electrode material of a lithium-air battery, consisting essentially of:
   preparing a manganese dioxide/carbon complex by dispersing carbon in a manganese dioxide precursor solution and applying microwaves for 5-10 minutes, filtering and drying the manganese/carbon solution to obtain the manganese dioxide/carbon complex; and
   preparing a platinum-manganese dioxide/carbon complex by dispersing the manganese dioxide/carbon complex in ethylene glycol, adding a platinum precursor and applying microwaves for 5-10 minutes to a resulting platinum-manganese dioxide/carbon solution to obtain the platinum-manganese dioxide/carbon complex.

2. The method for preparing a platinum-manganese dioxide/carbon complex for a positive-electrode material of a lithium-air battery according to claim 1, wherein the manganese dioxide precursor is potassium permanganate.

3. The method for preparing a platinum-manganese dioxide/carbon complex for a positive-electrode material of a lithium-air battery according to claim 1, wherein the manganese dioxide precursor is dissolved via a solvent, the solvent being either water or ethylene glycol.

4. The method for preparing a platinum-manganese dioxide/carbon complex for a positive-electrode material of a lithium-air battery according to claim 1, wherein 20 parts by weight of the manganese dioxide precursor is used per 100 parts by weight of carbon.

5. The method for preparing a platinum-manganese dioxide/carbon complex for a positive-electrode material of a lithium-air battery according to claim 1, wherein the platinum precursor is chloroplatinic acid.

6. The method for preparing a platinum-manganese dioxide/carbon complex for a positive-electrode material of a lithium-air battery according to claim 1, wherein 20 parts by weight of the platinum precursor is used per 100 parts by weight of carbon.

7. A lithium-air battery comprising:
   a platinum-manganese dioxide/carbon complex prepared by preparing a manganese dioxide/carbon complex by dispersing carbon in a manganese dioxide precursor solution and applying microwaves for about 5-10 minutes, filtering and drying the manganese/carbon solution to obtain the manganese dioxide/carbon complex, and preparing a platinum-manganese dioxide/carbon complex by dispersing the manganese dioxide/carbon complex in ethylene glycol, adding a platinum precursor and applying microwaves for about 5-10 minutes to a resulting platinum-manganese dioxide/carbon solution to obtain the platinum-manganese dioxide/carbon complex.

* * * * *